R. J. GOODNOW.
FLUID MEASURING DEVICE.
APPLICATION FILED SEPT. 5, 1911.
1,019,453.
Patented Mar. 5, 1912.
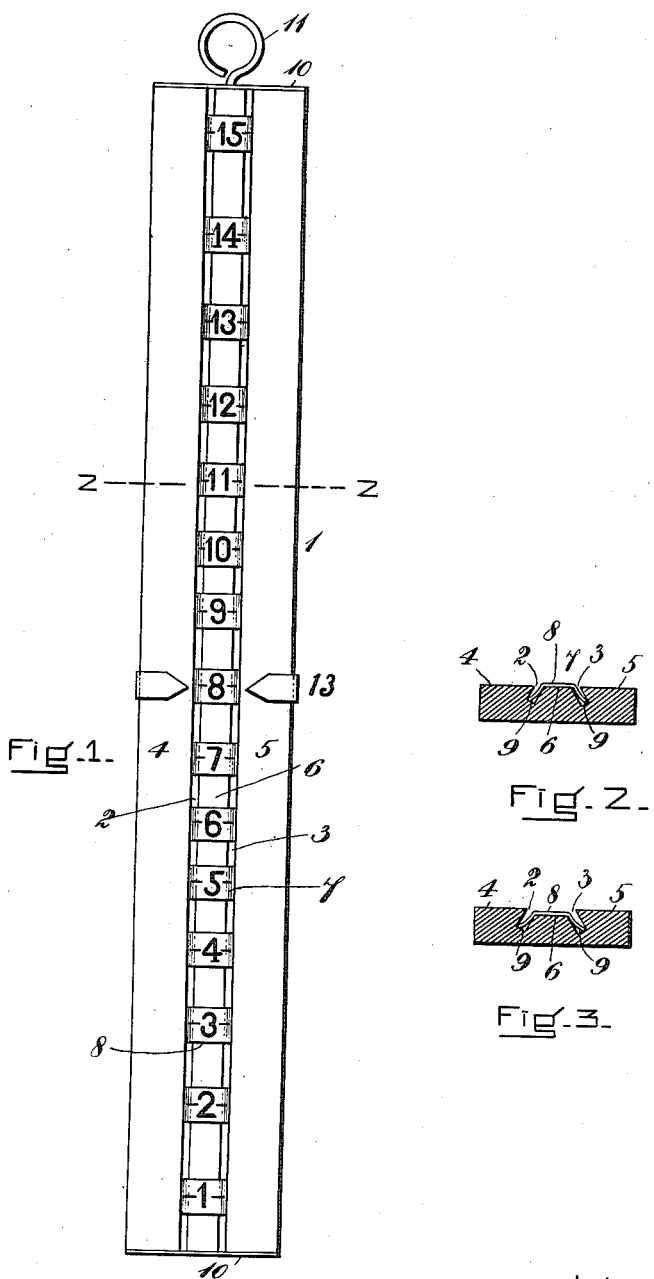

UNITED STATES PATENT OFFICE.

RUSSELL J. GOODNOW, OF BOSTON, MASSACHUSETTS.

FLUID-MEASURING DEVICE.

1,019,453.	Specification of Letters Patent.	Patented Mar. 5, 1912.

Application filed September 5, 1911. Serial No. 647,523.

*To all whom it may concern:*

Be it known that I, RUSSELL J. GOODNOW, of Boston, in the county of Suffolk and State of Massachusetts, a citizen of the United States, have invented a new and useful Improvement in Fluid-Measuring Devices, of which the following is a full, clear, and exact description, reference being had to the accompanying drawings, forming a part of this specification, in explaining its nature.

My invention relates to that type of measuring device or rule essentially adapted for measuring the amount of gasolene in a tank and especially those gasolene tanks carried by automobiles. As is well known, such tanks vary in their vertical cross sectional area with the effect that a device or rule for measuring the gasolene in the tank cannot be provided with uniformly spaced indices or units relatively corresponding in their spaced positions with the size and form of the particular tank. Accordingly such devices or rules have been provided with movable units or indices capable of being moved longitudinally along the device or rule and set in their properly graduated positions or those corresponding with the depth of gasolene in the particular tank dependent upon the number of gallons of gasolene therein. It is of course necessary that the movable units or indices be such as to be easily movable along the body of the rule as occasion may require and become set in any graduated position so securely as to insure against their accidental displacement. It is also hardly necessary to explain that the element of simplicity and consequent economy in manufacture is a very essential factor in a rule or device of the kind in question.

It is accordingly the object of my invention to provide a rule of the above character with a series of movable indices or units in the nature of clips which will so combine with the rule as to have a positive self-interlocking engagement with the body of the rule when set in their properly adjusted positions, though capable of being moved along the rule to occupy such positions; and which clips will also so combine with the rule or occupy such set positions in their relation thereto as to practically insure the clips against accidental displacement.

The device or rule comprising my invention can best be seen by reference to the drawings, in which—

Figure 1 shows the device in front elevation. Fig. 2 is a cross section thereof on the line 2—2 of Fig. 1, and Fig. 3 is a cross section of the device or rule having a slightly modified construction and to which special reference will hereinafter be made.

Referring to the drawings:—1 represents the body of the device or measure and which consists of a rod of wood or other suitable material. In cross section said rod is preferably rectangular or of such shape that it will present a flat face on one side thereof. The face of the rod is provided with separate spaced slots or grooves 2 and 3, respectively. These slots are parallelly arranged and run preferably throughout the entire length of the rod. The slots accordingly divide the face of the rod into what may be termed two outside portions 4 and 5, respectively, and an inner portion 6. The slots 2 and 3 are also angularly inclined slots, the same being preferably outwardly inclined as may be seen by reference to Fig. 2 where the device is shown in cross section.

Arranged to slide upon the portion 6 of the rod are a series of clips 7. Each of these clips is made of thin metal plate and comprises a central or body portion 8 which extends laterally over the portion 6 of the rod, and turned ends 9 which enter the respective slots 2 and 3 formed therein. In this connection it will be observed that the portion 8 of the clips fits snugly against the portion 6 of the rod and by reason of the relatively thin metal plate from which the clips are made the body of the clip will accordingly extend but little beyond the face of said portion 6. The turned ends 9 of the clips not only enter the slots, but are angularly bent to have a normal angular inclination different from that of the slots whereby they may yieldingly bear against the walls of the respective slots. In the construction shown the clips are so bent that the turned ends thereof will have a normal angular inclination less than the inclination of the slots with the effect that the ends of the clips when placed in the slots, by inserting the same from one end of the rule, will yieldingly bear against the outer walls of the respective slots with considerable pressure or so that the clips are held very securely in place though capable of being moved longitudinally along the rod to any adjusted position.

The ends of the rod may be provided as shown with end pieces or plates 10 fixed thereto in any suitable manner. These plates close the ends of the slots 2 and 3 so that after the clips are placed on the rod they cannot be withdrawn therefrom until one or the other of the plates 10 is removed. The plate 10 at the upper end of the rod is preferably provided with an eye 11 convenient for handling the measure.

The clips make a very simple and practical index or unit as upon them may be marked in numerical order as shown numbers for indicating the number of gallons of the gasolene or commodity to be measured.

In using the rule the unit-forming clips are set in their properly adjusted positions by applying the thumb nail thereto and, while they offer considerable resistance to movement, yet they can be moved as occasion may require. When set, however, in adjusted position, owing to the small amount of surface presented by them (which surface is practically flush with the face of the rod) and owing also to the manner in which they grip the rod, they are practically impervious to any accidental displacing influence, it being necessary to move the clips by some positive action in order to change their positions. In this same connection also it will be seen that owing to the rod presenting a wide flat face on which the clips are arranged, the clips can never be brought into contact with the edge of a circular opening through which the rod might be inserted inasmuch as the body of the rod would cut the opening in the manner of a segment and the clips would be held away from such edge. If desired the portion 6 of the rod between the slots therein may be countersunk below the surfaces of the adjacent portions 4 and 5 of the rod on either side thereof, as shown in Fig. 3. In such case the exterior surface presented by the clip would be flush or even below the surfaces presented by the adjacent portions of the rod and accordingly would be out of the way from accidental displacement though accessible to be moved in the manner above described.

There is shown in Fig. 1 a clip 13 which is slidable and embraces the rod 1, the ends of which are opposite each other and which serves to mark the depth of gasolene in a tank at any given time. The user of an automobile at the beginning of a run can thus dip his measure into his tank and set the clip to indicate the depth of gasolene, which, when the clip is placed as shown in the drawings, will indicate that he has eight gallons. At any time during his run he can again measure the depth of gasolene and determine how much he has consumed.

Having thus fully described my invention, I claim and desire to secure by Letters Patent of the United States:—

1. The measure of the character specified comprising a rod having formed therein separate spaced slots parallelly arranged to extend longitudinally along said rod on one side thereof and angularly inclined, a series of movable clips each having a central or body portion extending laterally over the portion of said rod between the slots therein and with turned ends contained within said slots, the turned ends of said clips having a normal angular inclination different from that of said slots whereby said clips may yieldingly bear against the walls of said slots.

2. The measure of the character specified comprising a rod having formed therein separate spaced slots parallelly arranged to extend longitudinally along said rod on one side thereof and angularly and outwardly inclined, a series of movable clips each having a central or body portion extending laterally over the portion of said rod between the slots therein and with outwardly turned end portions contained within said slots, the outwardly turned end portions of said clips having a normal angular inclination less than that of said slots whereby said clips may yieldingly bear against the outer walls of said slots.

RUSSELL J. GOODNOW.

Witnesses:
JOHN E. R. HAYES,
M. E. FLAHERTY.